Nov. 11, 1952    R. W. KNIGHT    2,617,572
AUXILIARY VEHICLE FRAME
Filed Aug. 15, 1947    2 SHEETS—SHEET 1
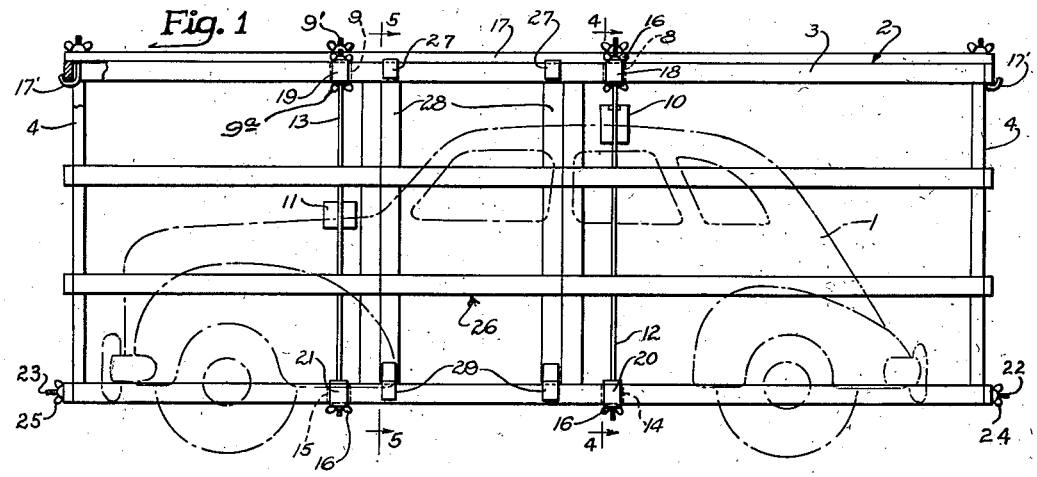
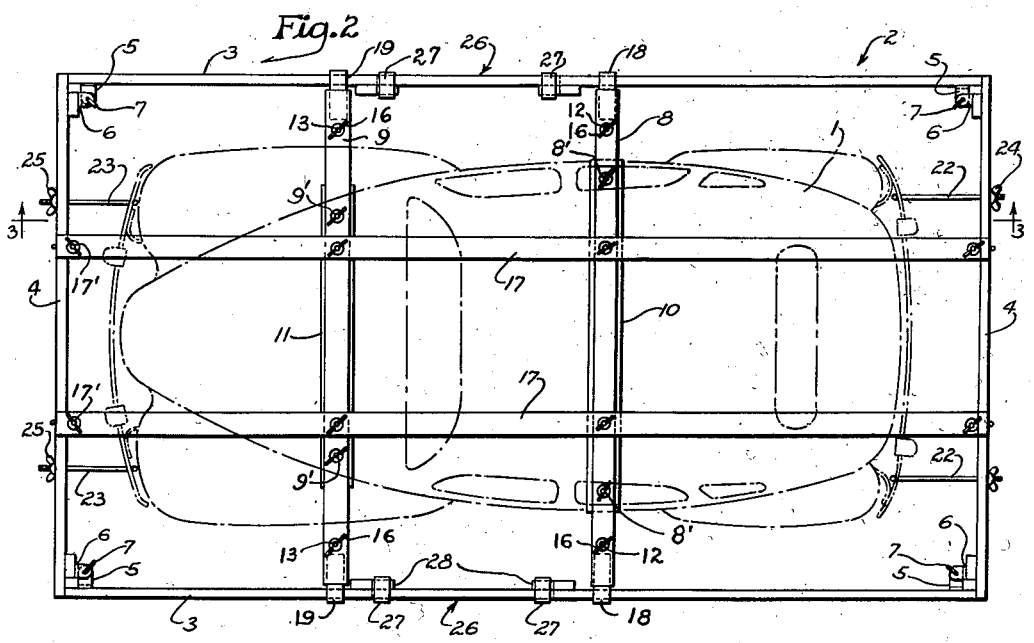
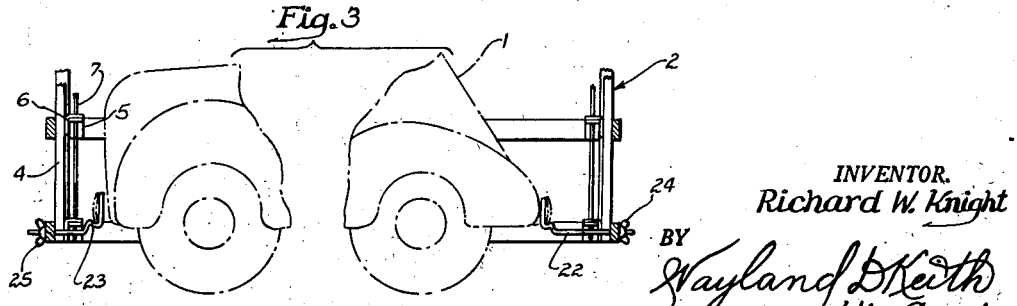
INVENTOR.
Richard W. Knight
BY Wayland D. Keith
His Agent Nov. 11, 1952 — R. W. KNIGHT — 2,617,572
AUXILIARY VEHICLE FRAME
Filed Aug. 15, 1947 — 2 SHEETS—SHEET 2
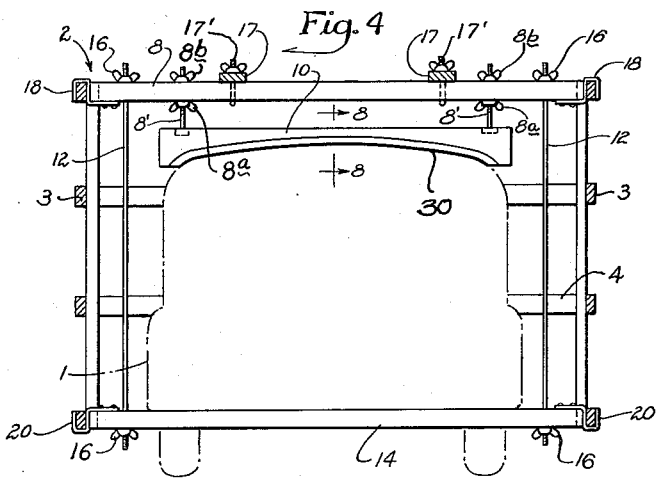
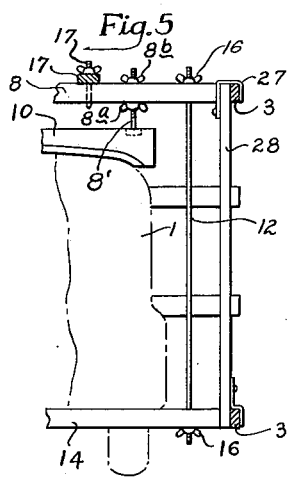
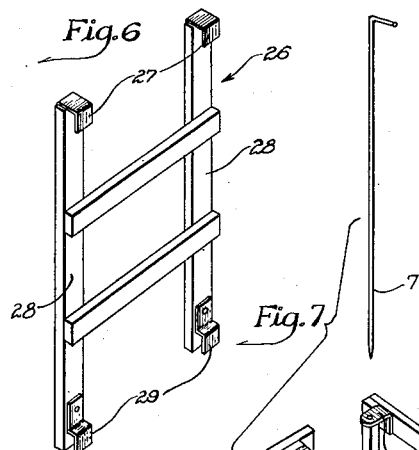
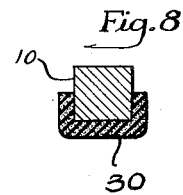
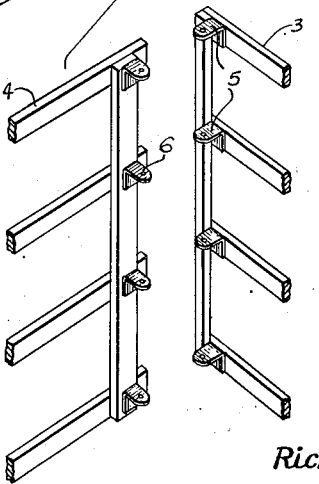
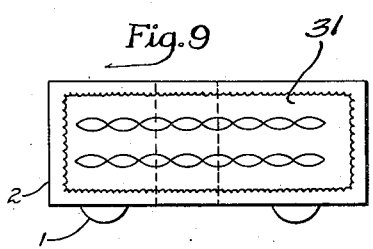
INVENTOR.
Richard W. Knight
BY Wayland D. Keith
His Agent Patented Nov. 11, 1952

2,617,572

UNITED STATES PATENT OFFICE 2,617,572

AUXILIARY VEHICLE FRAME

Richard W. Knight, Wichita Falls, Tex.

Application August 15, 1947, Serial No. 768,772

5 Claims. (Cl. 224—42.1)

This invention relates to auxiliary frames for automobiles and the like, and to the manner of attaching such frames thereto, and more particularly to auxiliary frames to which decorative materials may be secured so as to form a float frame for use in parades, processions, pageants and the like.

Heretofore it has been quite difficult to decorate an automobile, as the surface thereof does not readily lend itself to the attachment of decorative materials without defacing said car surface. Also the decorative preparation of a car to be driven in a parade has been a time-consuming task, and frequently merchants and civic leaders have been deterred from participating in such events because they could not do without the car or truck a sufficient length of time for it to be properly decorated. Any merchant or firm who placed a car in a parade would want it to be well and attractively decorated, if it was to bear the name of the participant, but this not only required time, but considerable money and skill, and could be used only one time.

The present invention may be completely assembled and decorated before it is placed on the car, and it is sufficiently light in weight that it can be placed over the car and secured thereto a few minutes before the parade is to start, and as quickly removed so that the car may be back in its routine use a few minutes after the parade is over. The talent of skilled decorators may be used more effectively, as the work may be planned and carried out without having to consider how long the car will be out of use. This auxiliary frame may be quickly dis-assembled and stored in a small space for reuse time after time, thus saving much labor and expense, but at the same time allowing the owner of the car to participate in civic events when he would not be able to do so otherwise.

The present invention, being adjustable, is adaptable for use on a wide variety of makes of cars and trucks, and the adjustments can be made without permanently changing or altering the frame structure and without any special tools.

The primary object of this invention is to provide an auxiliary frame for attachment to a vehicle, which auxiliary frame is sectional in form, adjustable to the particular vehicle on which it is to be installed, readily assembled and dis-assembled, and adapted to receive a wide variety of decorative materials.

Another object of this invention is to provide an auxiliary frame for vehicles that can be assembled and decorated before being secured to the vehicle, and that may be dis-assembled and stored in a very small space, but which may be reassembled and redecorated time after time.

Still another object of this invention is to provide an auxiliary frame for vehicles which serves as a foundation for a decorative "float" this is light in weight, inexpensive to make, easily assembled and installed, easily removed and disassembled for storage, and which is also capable of reuse.

An embodiment of this invention is illustrated in the accompanying drawings, in which:

Fig. 1 is a side elevational view of the frame installed about a conventional type automobile, with the automobile shown in dot-dash outline;

Fig. 2 is a top plan view of the frame as installed on an automobile;

Fig. 3 is a fragmentary elevational view of a portion of the frame installed on an automobile, showing the details of construction enlarged, and with parts shown in section, parts broken away and shortened;

Fig. 4 is a sectional view taken on the line 4—4 of Fig. 1, looking in the direction indicated by the arrows;

Fig. 5 is a sectional view taken on the line 5—5 of Fig. 1, but showing only one side of the frame;

Fig. 6 is a perspective view of a portion of the frame installed adjacent the door of the automobile to permit entrance or exit therethrough;

Fig. 7 is a perspective exploded view of a corner portion of the frame members, showing the lugs and pins which join the side frame members together.

Fig. 8 is a sectional view taken on the line 8—8 of Fig. 4; and

Fig. 9 is a side elevational view of an automobile having a decorated, auxiliary frame thereon.

For purposes of illustration the invention is described for use on a conventional automobile, it is to be understood that this float frame is applicable to any type vehicle, as designated by the occasion, for instance, in a historical pageant, horse drawn vehicles might be used. Also for purposes of illustration, the frame is described as made of wood, because wood is comparatively light in weight and decorative materials could be readily secured thereto, but it is to be further understood that any suitable material or combination of materials may be used for this frame.

With more detailed reference to the drawings, the numeral 1 designates a conventional type vehicle, such as an automobile, on which the frame, generally designated as 2, is attached. The frame 2 comprises the side and end members 3 and 4 which have lugs 5 and 6 secured on the ends of the respective side members 3 and 4, which lugs on adjacent frame members are secured together to form the super structure of the auxiliary frame. (See Fig. 7.)

The lug members 5 and 6 have holes therethrough to receive the respective rods 7, which lock the adjacent corners of said side frame members 3 and 4 together, so as to form a rectangular frame. Support bars 8 and 9 pass above the top of the vehicle and have adjustable, downwardly projecting bolts 8' and 9' adapted to engage transverse members 10 and 11 located directly below the respective members 8 and 9. By the adjustment of the bolts 8' and 9' the distance between members 10 and 11 and the respective transverse frame members 8 and 9, may be adjusted so as to space the frame members 8 and 9 the desired distance above the vehicle body, and to normally support the weight of the frame through bolts 12 and 13.

Pairs of vertical bolts 12 and 13 pass through the respective members 8 and 9 and extend downward through transverse members 14 and 15, which transverse members 14 and 15 are disposed directly below the respective members 8 and 9. Wing nuts 16 are provided on the ends of bolts 12 and 13, so as to hold the transverse braces 14 and 15 in suspended relation with respect to members 8 and 9.

The transverse members 8 and 9 have hooks 18 and 19 on the respective outer ends thereof, which hooks open downwardly and are attached to the outer ends of the respective transverse members for engagement with the upper rail of the side frame members 3. Disposed immediately below, and formed substantially in the same manner, are two transverse members 14 and 15 which have similar hooks 20 and 21 secured to the respective outer ends thereof, but which hooks face upwardly to engage the lowermost rail of side frame members 3, so as to support the side frame members.

The rods 12 and 13 pass through the respective members 8 and 9 at the ends thereof and extend downwardly and pass through members 14 and 15 at the ends thereof and have wing nuts 16 mounted on the upper and lower ends of bolts 12 and 13. These bolts are threaded along the length thereof to permit adjustment of the wing nuts therealong.

Two or more longitudinal members 17 pass above the top of transverse members 8 and 9 and have the forward and rearward ends thereof secured to the upper rail of the end members 4 by J-bolts 17'. The longitudinal members 17 serve also to reinforce the frame members and to present additional strips to which decorative materials may be secured for decorating the car and to conceal the frame-work and the car therebeneath.

As shown in Fig. 4, a transverse bar 10 is positioned across the top of the car and is spaced immediately rearward of the door. A member 9 having a member 11 spaced directly therebelow engages another portion of the top of the car, such as the hood, so as to give two-point suspension of the frame, as will be hereinafter more fully described. The members 10 and 11 have cushions 30 therebeneath. These cushions may be of sponge rubber or the like, as indicated in Fig. 8, which will prevent the frame from marring the finish of the automobile or other vehicle on which it is used.

The bolts 8' and 9' pass through the respective transverse members 8 and 9 and project downwardly to engage members 10 and 11 respectively, so as to hold the members 10 and 11 in binding engagement with the top of the car and in spaced relation from the transverse members 8 and 9 respectively.

The wing nuts 8a and 9a are positioned below transverse members 8 and 9, respectively, and wing nuts 8b and 9b are positioned above transverse members 8 and 9, respectively, so that by the manipulation of these wing nuts 8a and 9a the respective members 10 and 11 can be urged downward upon the top of the car so as to push transverse members 8 and 9 upward, which, in turn, will lift members 14 and 15 into binding engagement with the underside of the car by means of bolts 12 and 13.

Side frame members 3 may be held in place and supported between hooks 18 and 20 rearward of the car door, and hooks 19 and 21 forward of the car door. With the frame members 3 supported between these hooks, as above mentioned and with the bottom members 14 and 15 drawn into binding engagement with the underneath side of the car by the transverse members 10 and 11 being forced downward to contact the top of the car, the entire weight of the frame is held in spaced relation to the car. The end frames 4 are positioned at the ends of side frames 3, and are so positioned that rod 7 may be passed through the respective pairs of adjacent lugs 5 and 6 at each corner of the frame. The rods 7 pass through the lugs and hold the end members in contact relation with the sides, so as to form a double step joint reinforcement which does not readily yield or get out of square, when thus pinned together at all four corners.

One of the lowermost end rail members of each end frame 4 has pairs of J-bolts 22—23 passing therethrough and adapted to hook over the bumpers of the car, as will best be seen in Figs. 2 and 3 so as to stabilize the frame 2 against endwise movement. The J-bolts 22—23 have wing nuts 24—25 respectively mounted thereon so that the bolts may be tightened to put tension on the bumper at each end of the car. With the frame supported by two transverse supports 10 and 11 at the top and by pairs of J-bolts 22 and 23 at the ends, the frame presents a comparatively rigid structure.

A door or entrance to the car may be provided on either or both sides, as indicated generally at 26. This door panel 26 may be made removable by providing hooks 27 at the top ends of upright rails 28 to engage the top rail of side frame 3, and hooks 29 at the lower ends thereof, to engage the bottom rail of the side frame 3. Horizontal side rails are attached to the upright rails 28 of the removable panel 26, intermediate the length of the rails 28, so as to register with the side rails of side frame 3, to present a continuation of the side rails of the side frame 3; and to which side rails decorative materials may be affixed according to the design of the float and the taste of the decorator. The juncture between the main frame side rails and the door panel 26 may serve as a parting line in the application of the decorations, so as to allow the ready removal of the door panel 26.

It is to be understood that the frame may be decorated before it is placed on and secured to the car, but if desired, the frame may be placed on the car and then decorated.

It can be appreciated readily that a great variety of decorative effects may be obtained and that a variety of materials may be used, such as metal foils, colored cellophane, flowers, bunting and the like. The frame is sufficiently sturdy to support statues, statuettes, replicas, and even costumed characters, above the car. Therefore it is pointed out that this auxiliary frame is adaptable to a wide variety of uses to cover almost any conceivable need for a float. The decorative material is shown in Fig. 9 as applied to the frame, as indicated generally at 31.

Provision is made in the spacing of the end rails so that an opening may be formed at the front of the frame to permit the driver of the vehicle to see ahead. Since the speed of a parade or the like is usually slow and the traffic controlled, no provision is made for side view driving, but this may be readily done as desired.

Having thus described the invention what is claimed is:

1. An auxiliary frame for vehicles comprising multi-rail side and end frame members, said members adapted to be formed into a substantially rectangular frame, lugs, each having a hole therein, positioned near each end of each of said frame members, said lugs on adjacent ends of said frame members adapted to have a rod pass through said holes so as to interlock said lugs to form said frame members into a substantially rectangular frame about said vehicle, cushioned support members positioned above said vehicle and transversely thereof, transverse top frame members adjustably positioned above said cushioned transverse supports and spaced therefrom, screw threaded rods extending downwardly from said transverse top frame members and engaging transverse members passing beneath the vehicle, screw threaded means for tightening the rods so as to draw the last mentioned transverse members into binding engagement with the under side of the vehicle to support said auxiliary frame about said vehicle.

2. An auxiliary frame for a vehicle comprising multi-rail side and end frame members, said members adapted to be formed into a frame about said vehicle, lugs secured near the ends of each frame member, each lug having a hole therein, said lugs on adjacent frame members receiving a rod therethrough to interlock said frame members into a substantially rectangular frame about said vehicle, cushioned members adapted to rest transversely on said vehicle, said cushioned members carrying adjustable supports for supporting top transverse frame members a spaced distance from said cushioned members, longitudinal top members secured to said transverse frame members and supported thereby to form a top, said top frame members adapted to be secured to said side and end frame members and which side and end frame members are at least partially supported thereby, screw-threaded rods secured to and extending downwardly from said top frame members and engaging transverse members that pass below the vehicle, nuts on said screw threaded rods adapted to be tightened to bring said lowermost transverse members into binding engagement with the underside of said vehicle so as to support said auxiliary frame, said top, end, and side frame members adapted to receive decorative material.

3. An auxiliary frame for vehicles comprising side and end frame members, lugs secured near the ends of each frame member, each lug having a hole therein, lugs on adjacent frame members receiving a rod for interlocking said adjacent ends of said frame members to form a frame about said vehicle, members adapted to rest on top of said vehicle and carrying adjustable support members, a top frame comprising both longitudinal and transverse rails secured together, some of the transverse rails of said top frame being adapted to be received and supported by said adjustable support members, screw-threaded rods depending from the top transverse rails and engaging transverse bottom members adapted to pass beneath said vehicle, nuts for tightening said rods to bring said bottom transverse members into binding engagement with the under side of said vehicle to hold said auxiliary frame in place thereon, at least one of said side frame members having a removable panel therein in position to register with the door of said vehicle and to provide entrance and exit therethrough, and means for detachably mounting said panel on the side frame member to form a continuation thereof.

4. An auxiliary frame for vehicles comprising side and end frame members, lugs secured near the ends of each frame member, each lug having a hole therein, lugs on adjacent frame members receiving a rod for interlocking said adjacent ends of said frame members to form a frame about said vehicle, members adapted to rest on top of said vehicle and carrying adjustable support members, a top frame comprising both longitudinal and transverse rails secured together, some of the transverse rails of said top frame being adapted to be received and supported by said adjustable support members, screw-threaded rods depending from the top transverse rails and engaging transverse bottom members adapted to pass beneath said vehicle, nuts for tightening said rods to bring said bottom transverse members into binding engagement with the under side of said vehicle to hold said auxiliary frame in place thereon.

5. An auxiliary frame for vehicles comprising side and end members, lugs secured to each frame member near the ends thereof, each lug having a hole therethrough, lugs on adjacent frame members receiving a rod therethrough interlocking said adjacent ends of said frame members to form a frame about a vehicle, a top frame member having both transverse and horizontal rails secured together, supports adapted to rest transversely on said vehicle and carrying adjustable support members, said support members receiving and supporting said top frame members a spaced distance from said transverse supports, rods passing through said top transverse frame members near the ends thereof, said rods being screw-threaded and engaging bottom transverse members which pass beneath said vehicle, nuts on said rods to bring the bottom transverse members into binding engagement with the under side of said vehicle, bolts for connecting the lowermost rail of said end frame members to the ends of said vehicle to hold said auxiliary frame in place thereon, said end, side and top frame members being adapted to receive decorative material.

RICHARD W. KNIGHT.

REFERENCES CITED

The following references are of record in the file of this patent:

UNITED STATES PATENTS

| Number | Name | Date |
| --- | --- | --- |
| 155,861 | Clemens | Oct. 13, 1874 |
| 1,548,527 | Hillgren | Aug. 4, 1925 |
| 1,835,480 | Fendorf | Dec. 8, 1931 |
| 1,984,681 | Jackson | Dec. 18, 1934 |
| 2,080,764 | Crawford | May 18, 1937 |
| 2,100,971 | McDonald | Nov. 30, 1937 |
| 2,109,571 | Le Boeuf | Mar. 1, 1938 |
| 2,357,203 | Jimmes | Aug. 29, 1944 |

FOREIGN PATENTS

| Number | Country | Date |
| --- | --- | --- |
| 621,784 | France | Feb. 12, 1927 |